(12) United States Patent
Fan et al.

(10) Patent No.: US 8,507,092 B2
(45) Date of Patent: *Aug. 13, 2013

(54) DUST SUPPRESSANTS

(75) Inventors: Wayne W. Fan, Cottage Grove, MN (US); Dong-Wei Zhu, Shoreview, MN (US); Qin Zhu, Shanghai (CN); Jeffry L. Jacobs, Hastings, MN (US); Mary Lou Morris, White Bear Lake, MN (US); Kathleen R. Reynolds, Roseville, MN (US); Uyen N. Tang, Huntington Beach, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,653

(22) Filed: Feb. 6, 2012

(65) Prior Publication Data
US 2012/0135240 A1 May 31, 2012

Related U.S. Application Data

(63) Continuation of application No. 12/614,523, filed on Nov. 9, 2009, now Pat. No. 8,124,231.

(60) Provisional application No. 61/151,021, filed on Feb. 9, 2009.

(51) Int. Cl.
*B32B 5/16* (2006.01)

(52) U.S. Cl.
USPC .................. 428/402; 428/403; 427/136

(58) Field of Classification Search
USPC .................. 428/403, 407; 427/136
See application file for complete search history.

(56) References Cited

U.S. PATENT DOCUMENTS

| | | | |
|---|---|---|---|
| 2,854,347 A | 9/1958 | Booth et al. | |
| 2,981,636 A | 4/1961 | Lodge et al. | |
| 3,479,201 A | 11/1969 | Sloan | |
| 3,528,842 A | 9/1970 | Skadulis | |
| 3,763,072 A | 10/1973 | Krieger | |
| 3,900,611 A | 8/1975 | Corbett et al. | |
| 4,417,992 A | 11/1983 | Bhattacharyya et al. | |
| 4,551,261 A | 11/1985 | Salihar | |
| 4,594,268 A * | 6/1986 | Kirwin | 427/136 |
| 4,650,598 A | 3/1987 | Roberts et al. | |
| 4,801,635 A | 1/1989 | Zinkan et al. | |
| 4,981,398 A | 1/1991 | Field et al. | |
| 5,009,511 A | 4/1991 | Sarko et al. | |
| 5,194,174 A | 3/1993 | Roe et al. | |
| 5,240,760 A | 8/1993 | George et al. | |
| 5,286,544 A | 2/1994 | Graham | |
| 5,356,664 A | 10/1994 | Narayan et al. | |
| 5,362,566 A | 11/1994 | George et al. | |
| 6,372,842 B1 * | 4/2002 | Grisso et al. | 524/547 |
| 6,458,642 B1 | 10/2002 | Yeh et al. | |
| 6,569,520 B1 | 5/2003 | Jacobs | |
| 6,881,701 B2 | 4/2005 | Jacobs | |
| 8,124,231 B2 * | 2/2012 | Fan et al. | 428/403 |
| 2005/0074580 A1 | 4/2005 | Gross et al. | |
| 2005/0142329 A1 | 6/2005 | Anderson et al. | |
| 2007/0073590 A1 | 3/2007 | Cosentino et al. | |
| 2007/0077406 A1 | 4/2007 | Jacobs et al. | |
| 2007/0218314 A1 | 9/2007 | Anderson et al. | |
| 2008/0017829 A1 | 1/2008 | Talamoni | |
| 2009/0090890 A1 | 4/2009 | Nguyen | |

FOREIGN PATENT DOCUMENTS

| | | |
|---|---|---|
| JP | 56-133392 | 10/1981 |
| JP | 1-301246 | 12/1989 |
| JP | 2001-211762 | 8/2001 |
| JP | 2006-235198 | 9/2006 |
| KR | 10-2005-0020695 | 3/2005 |
| WO | WO2005/121272 | * 12/2005 |
| WO | WO 2005/121272 | 12/2005 |

OTHER PUBLICATIONS

Perez-Liminana, M. Angeles, et al., "Characterization of Waterborne Polyurethane Adhesives Containing Different Amounts of Ionic Groups," *International Journal of Adhesion & Adhesives*, vol. 25, Issue 6 (2005) p. 507-517.

PCT International Search Report, PCT/US2010/023431, dated Sep. 16, 2010.

Schneider, H.A., "Polymer Class Specificity of the Glass Temperature," *Polymer*, vol. 46, Issue 7, (Mar. 10, 2005) p. 2230-2237.

\* cited by examiner

*Primary Examiner* — Leszek Kiliman

(57) ABSTRACT

A surface having dust particles thereon and a coating on the surface comprising a coating polymer having a Tg less than −20° C. A method of reducing dust, the method including providing a surface having dust particles thereon and coating the surface with a coating polymer with a Tg less than −20° C.

25 Claims, No Drawings

DUST SUPPRESSANTS

CROSS-REFERENCE TO RELATED APPLICATION

This application is a continuation of U.S. patent application Ser. No. 12/614,523, filed Nov. 9, 2009, (now U.S. Pat. No. 8,124,231), which claims the benefit of U.S. Provisional Patent Application No. 61/151,021, filed Feb. 9, 2009.

FIELD

The present application is in the field of dust suppressants, for use to reduce airborne dust particles.

BACKGROUND

Dust formation/generation and spreading have been a continuing cause of environmental and health concerns. Dust spreading is a common problem found on transportation thoroughfares, mines, mineral transportation and storage piles, tailings storage, power plant stock piles, construction sites, unpaved roads and other areas where particulates may be dispersed into the air and onto surrounding surfaces. Dust generation is where dust, small particles of materials, is formed. For example, in the processing and handling of inorganic granules such as roofing granules, small particles are generated. Where these particles are small (<30 mm) enough, they become dust. Generally, dust is airborne or capable of becoming airborne.

The spreading and generation of dust particles present an environmental (air quality) issue that must be dealt with by the manufacturer, the distributors and the end-users. A common method that has been used to suppress and control the dust consists of merely wetting down the area with water.

Wetting with water is environmentally benign and low cost. However, this method has a very limited duration, as once the water evaporates, the effect no longer exists. Moreover, because of its limited duration, a tremendous amount of water resources are wasted. In attempts to improve upon this, hygroscopic salts such as magnesium chloride or calcium chloride are often added to the water in attempts to enhance the surface moisture retention. Although more effective, these compositions result in high usage of salts and have undesired environmental impacts. Another method used to control dust generation is spraying the area with an oil. Although quite effective at suppressing dust generation for extended periods of time, this method is not as environmentally friendly. In addition to possible environmental issues, it may pose a significant long term clean-up problem and even potential health concerns. Moreover, the oil treated substrates may adhere to vehicles attempting to travel over the treated surfaces, generating unwanted clean-up, excess wear on mechanical equipment, and accelerated breakdown of the treated surfaces. Oils additionally may change the properties of the coated surface, for example oils may cause an unwanted change in color. Synthetic polymers have also been used to abate dust spreading by changing the physical properties of the soil or dusty surfaces. The polymeric molecules can possibly coat and agglomerate the dust particles together, making them heavier and therefore reduce the spreading of the dust particles significantly.

Most of the reported polymeric dust suppressants are polyvinyl acetate and vinyl acrylic polymer latex. See, for example, U.S. Pat. No. 6,372,842. Aqueous solutions are also described, for example in U.S. Pat. Nos. 5,194,174; 4,417,992 and 4,801,635.

Other examples include those described in EP01234106A2; U.S. Pat. No. 3,900,611; U.S. Pat. No. 3,763,072; WO 2005/121272 and U.S. Patent Application Publication No. 2007/073590.

However, the performance relationship to the flexibility of the polymeric chains (as measured by their glass transition temperature, Tg) was never revealed. Actually, all reported polymer based dust suppressants are with relatively high glass transition temperatures (Tg >0° C.). These relatively high Tg polymeric dust suppressants may provide adequate performance in the static applications, however, their performance in dynamic applications may be poor because the film formed on the surface is too brittle to be kept intact under the dynamic conditions, such as moving and tumbling, as well as heavy traffic. Specifically, dynamic conditions include heavy traffic on unpaved roads, materials on a conveyor belt and crushing, and in the roofing granule process.

SUMMARY

The present application is directed to the discovery of superior dust suppressant performances of soft polymeric compositions (Tg <−20° C.) and the method of using such polymer compositions to reduce the level of dust formation/spreading.

The present application is directed to an article comprising a dusty surface and a coating on the dusty surface comprising a coating polymer having a Tg less than −20° C. In some embodiments, the polymer has a Tg less than −30° C., and in specific embodiments, the polymer has a Tg less than −45° C. The dusty surface may be, for example, crushed stone, coal, iron ore, gravel, sand or other aggregates (e.g. a roofing granule,) or a soil surface.

Generally, the coating polymer comprises a polyacrylate, polyurethane, synthetic and natural rubber, silicone and other organic polymers. In specific embodiments, the coating polymer comprises an acrylic emulsion polymer.

The present application is also directed to a method of reducing dust, comprising providing a dusty surface and coating the surface with a coating polymer with a Tg less than −20° C.

DETAILED DESCRIPTION

The present application is directed to coatings on dusty surfaces, for example mining surfaces, soil or construction surfaces. For the purpose of the present application, a dusty surface has particles with a cross sectional length less than 30 micrometers on the surface. Generally, the particles are loose from the surface. Examples of surfaces include haul roads, mining material in an open railcar, materials on a conveyor belt, coal and mining materials such as iron ore stock piles in power plants and steel mills, unpaved rural roads and roofing granule surfaces. Specific examples of dusty surfaces include aggregates, i.e. crushed rock, coal, iron ore, gravel, and sand.

The coating polymer comprises water based polymers. Examples of these polymers include polyacrylate (e.g. an acrylic emulsion polymer), synthetic and natural rubber, polyurethane, and silicone polymers. Generally, these polymers possess a low Tg, such as a Tg less than −20° C. For example, the Tg is less than −30° C. In specific examples, the Tg is less than −45° C.

Polyacrylates can be prepared by emulsion polymerization of one or more acrylate monomers in the presence of surfactants and initiators. The monomers may include isobornyl acrylate, ethyl acrylate, methyl acrylate, butyl acrylate, isooctylacrylate, 2-ethyl hexyl acrylate, 2-hydroxy ethyl acrylate, hydroxy propyl acrylate and mixtures thereof. Polar monomers can also be added at 0-30% to improve the strength of these polymers. These polar monomers include acrylic acid, methacrylic acid, itaconic acid, N-vinyl pyrrolidone, N-vinyl caprolactam, substituted (meth)acrylamides, such as N,N,-dimethyl acrylamides and N-octylacrylamide, dimethylaminoethyl methacrylate, acrylonitrile, 2-carboxyethyl acrylate, maleic anhydride, and mixtures thereof.

Water-soluble and oil-soluble initiators useful in the present application are initiators that, on exposure to heat, generate free-radicals which initiate polymerization of the acrylate monomers. Water soluble initiators are preferred. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO 64 (2,2'-azobis(isobutyronitrile) and VAZO 52 (2,2'-azobis(2,4-dimethylpentanenitrile)), both available from E.I. du Pont de Numours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of co-polymerizable components in the pressure sensitive adhesive formulation.

The copolymerizable emulsion mixture may optionally further comprise a chain transfer agent. Examples of useful chain transfer agents include but are not limited to those selected from the group consisting of carbon tetrabromide, alcohols, mercaptans, and mixtures thereof. When present, the preferred chain transfer agent is isooctylthioglycolate and carbon tetrabromide. The emulsion mixture may further comprise up to about 0.5 parts by weight of a chain transfer agent, typically about 0.01 weight percent to about 0.5 parts by weight, if used, preferably about 0.05 parts by weight to about 0.2 parts by weight, based upon 100 parts by weight of the total copolymerizable emulsion mixture.

Polymerization via emulsion techniques requires the presence of one or more surfactants (which may also be called an emulsifying agent or an emulsifier). Useful surfactants for making the polyacrylate emulsions include those selected from the group consisting of anionic surfactants, nonionic surfactants, and mixtures thereof.

Useful anionic surfactants include but are not limited to those whose molecular structure includes at least one hydrophobic moiety selected from the group consisting of from about $C_6$- to about $C_{12}$-alkyl, alkylaryl, and/or alkenyl groups as well as at least one anionic group selected from the group consisting of sulfate, sulfonate, phosphate, polyoxyethylene sulfate, polyoxyethylene sulfonate, polyoxyethylene phosphate, and the like, and the salts of such anionic groups, wherein said salts are selected from the group consisting of alkali metal salts, ammonium salts, tertiary amino salts, and the like. Representative commercial examples of useful anionic surfactants include sodium lauryl sulfate, available from Stepan Chemical Co. as POLYSTEP B-3; sodium lauryl ether sulfate, available from Stepan Chemical Co. as POLYSTEP B-12; and sodium dodecyl benzene sulfonate, available from Rhone-Poulenc as SIPONATE DS-10.

Useful nonionic surfactants include but are not limited to those whose molecular structure comprises a condensation product of an organic aliphatic or alkyl aromatic hydrophobic moiety with a hydrophilic alkylene oxide such as ethylene oxide. The HLB (Hydrophilic-Lipophilic Balance) of useful nonionic surfactants is about 10 or greater, preferably from about 10 to about 20. The HLB of a surfactant is an expression of the balance of the size and strength of the hydrophilic (water-loving or polar) groups and the lipophilic (oil-loving or non-polar) groups of the surfactant. Commercial examples of nonionic surfactants useful in the present application include but are not limited to nonylphenoxy or octylphenoxy poly(ethyleneoxy)ethanols available from Rhone-Poulenc as the IGEPAL CA or CO series, respectively; $C_{11}$-$C_{15}$ secondary-alcohol ethoxylates available from Union Carbide as the TERGITOL 15-S series; and polyoxyethylene sorbitan fatty acid esters available from ICI Chemicals as the TWEEN series of surfactants.

Generally, the acrylic emulsion polymer is made in the presence of the anionic surfactant(s). A useful range of emulsifier concentration is from about 0.5 to about 8 weight percent, preferably from about 1 to about 5 weight percent, based on the total weight of all monomers of the emulsion polymer.

Polymerizable surfactants, those that can be reacted to the polymeric chains, may also be used in this application. The immobilization of the surfactants makes the final polyacrylates even more environmentally friendly.

Examples of suitable acrylic emulsion polymers include those sold under the tradename Fastbond 49, commercially available from 3M Company, and the tradename Robond, commercially available from Rohm and Haas.

Waterborne polyurethanes (with Tg <−25° C.) are mostly made by condensation polymerizations. An example of preparation and characterization can be found in this article: Characterization of waterborne polyurethane adhesives containing different amounts of ionic groups, International Journal of Adhesion and Adhesives, Volume 25, Issue 6, December 2005, Pages 507-517.

Synthetic rubbers are polymers made from the radical emulsion polymerization of isoprene, butadiene, isobutylene and optionally styrene.

Natural rubber is exuded from the rubber plant, mainly from *Hevea Brasillensis* (Euphorbiaceae family) by tapping.

The polymer compositions are generally manufactured to have between about 20% and about 60% solids, for example between 40 to 55%. They are diluted, generally in water, to about 0.1% to about 5% solids in described application, more preferably at about 0.5% to about 2% solids. Optionally, additives are added in the dilution stage to optimize dust suppressant performances. For example, when the substrate is a hydrophobic surface such as fine coal powder, a silicone based surfactant can be used to assist in the wetting of such surfaces. An example of such an additive is Dow Corning Q2-5211 Superwetting agent. It can be used to improve the surface wetting and penetration and therefore, improve dust suppression performances. The surfactant is generally added to the emulsion at the concentration of about 0.5%.

The compositions may also include biocidal agents. The term "biocidal" refers to the ability of any composition to inhibit the growth of or to kill microorganisms such as, for example, bacteria, fungi, mold, and algae. Any useful biocidal material can be utilized in the polymer composition. A partial listing of useful biocides includes inorganic antimicrobial agents, for example a photocatalytic material or a transition metal material, and/or an organic antimicrobial agent, for example, a quaternary ammonium compound.

In some embodiments, the polymer composition includes an adhesion promoter. This is especially useful in embodiments where the polymer composition is coated onto a dusty surface that will be bonded to another surface (for example roofing granules, which are later adhered to an asphalt surface). A typical adhesion promoter is silicone.

Other optional additives to the polymer composition include pigments, dyes and solar reflection particles.

The above compositions are generally sprayed onto dusty surfaces to suppress dust from becoming airborne. In some embodiments, the dusty surface is a mining surface. Effort has been made to control dust in these environments, especially the handling, transport and storage of the surfaces. For example, the polymer composition may be coated onto coal or iron ore surfaces during the transportation on open rail cars, on the coal and iron ore stock piles and on conveyor belts in steel mills and power plants, on the soil surfaces of construction sites, hauling roads of mines and unpaved rural roads.

In some embodiments, the dusty surface is a roofing granule. The granule is generally a base material, and may comprise coatings on the base material. Base materials employed in the present application can be the presently known or later-developed base materials. For example, the base material may be of a weather-resistant mineral rock such as greenstone, nepheline syenite, common gravel, slate, ganister, quartz, quartzite, greystone, dacite, andesite, argillite, coal slag, copper slag, nickel slag, glass etc. Other exemplary base materials are disclosed in U.S. Pat. No. 5,009,511, which are made from recycled materials.

The granules may be coated with a color coating. The color coatings may be ceramic or polymer bound pigments. Examples of color coatings include, for example, U.S. Pat. Nos. 2,981,636; 3,479,201; and 6,458,642.

The granules may be coated to make the granules solar reflective. See, for example, U.S. Patent Application Publication Nos. 2005-0074580 and 2005-0142329, incorporated by reference herein.

The granules may be coated with a copper coating. See, for example, U.S. Pat. Nos. 3,528,842; and 5,356,664 incorporated by reference herein. The structural layer or the substrate may additionally comprise a photocatalytic material. Examples of these photocatalytic structures can be found, for example, in U.S. Pat. Nos. 6,881,701 and 6,569,520, incorporated by reference herein. The photocatalytic material may be photocatalytic particles on the granules, or photocatalytic coatings within the binder. In some embodiments, the photocatalytic material is a granule having photocatalytic particles coated thereon. In some examples, the photocatalytic material is mixed within a separate layer. For additional specific examples of photocatalytic materials in structural layers and substrates, see, for example, U.S. Patent Application Publication Nos. 2007-0218314, and 2007-0077406, incorporated by reference herein.

The granules may also be coated with an oil. Controlling dust without the use of oil can be advantageous for various reasons. Such oil-free granules adhere better to certain adhesive binders, especially the adhesives that may be useful to bind granules to metal substrates. The granules may then be added to a structural layer, for example a metal tile or an asphalt shingle.

The present application can be further described with the following examples. These examples are merely for illustrative purposes only and are not meant to be limiting on the scope of the appended claims.

EXAMPLES

Comparative Example A

One kg of black roofing granules (available as WA51 from 3M Company) was mixed with 15 grams of water. The granules were then shaken for 45 seconds. A mixture was prepared comprising 2.0 grams of petroleum hydrocarbon naphthenic oil (available as Cross L500 from Cross Oil Refining and Marketing of Arkansas) and 0.04 grams of silicone (Silicone Water Repellant BS68 available from Wacker Chemical Corp. of Michigan). The oil/silicone blend was added to the granules and the granules were then shaken for 5 minutes. The granules were then placed in a 3 pound box and placed into an oven at 176° F. (80° C.) for one hour.

Examples 1-3

Examples 1-3 were made mixing 1 kg of black roofing granules (available as WA51 from 3M Company) with 15 grams of water and an acrylic emulsion adhesive of the type and amount shown in Table 1. The granules were then shaken for 45 seconds. A mixture was prepared comprising petroleum hydrocarbon naphthenic napthcnic oil (available as Cross L500 from Cross Oil Refining and Marketing of Arkansas) and silicone (Silicone Water Repellant BS68 available from Wacker Chemical Corp. of Michigan) of the amounts shown in Table 1. The oil/silicone blend was added to the granules and the granules were then shaken for 5 minutes. The granules were then placed in a 3 pound box and placed into an oven at 176° F. (80° C.) for one hour.

TABLE 1

| Example | 1 | 2 | 3 |
|---|---|---|---|
| Oil | 0.5 g | 0.5 g | 0.5 g |
| Silicone | 0.05 g | 0.05 g | 0.05 g |
| Acrylic emulsion adhesive 1 (available under the tradename Fastbond 49 from 3M Company) Tg −50° C. | 0.5 g | 0 | 0 |
| Acrylic emulsion adhesive 2 (available under the tradename Robond PS-35 from Rohm and Haas) Tg −40° C. | 0 | 0.92 g | 0 |
| Acrylic emulsion adhesive 3 (available under the tradename Robond PS-9340 from Rohm and Haas) Tg −40° C. | 0 | 0 | 0.92 g |

Comparative Example B

One kg of medium black roofing granules (available as WA53 from 3M Company) was mixed with 15 grams of water. The granules were then shaken for 45 seconds. A mixture was prepared comprising 2.0 grams of petroleum hydrocarbon naphthenic oil (available as Cross L500 from Cross Oil Refining and Marketing of Arkansas) and 0.05 grams of silicone (Silicone Water Repellant BS68 available from Wacker Chemical Corp. of Michigan). The oil/silicone blend was added to the granules and the granules were then shaken for 5 minutes. The granules were then placed in a 3 pound box and placed into an oven at 176° F. (80° C.) for one hour.

Examples 4-6

Examples 4-6 were made mixing 1 kg of medium black roofing granules (available as WA53 from 3M Company)

with 15 grams of water and an acrylic emulsion adhesive of the type and amount shown in Table 2. The granules were then shaken for 45 seconds. A mixture was prepared comprising petroleum hydrocarbon naphthenic oil (available as Cross L500 from Cross Oil Refining and Marketing of Arkansas) and silicone (Silicone Water Repellant BS68 available from Wacker Chemical Corp. of Michigan) of the amounts shown in Table 2. The oil/silicone blend was added to the granules and the granules were then shaken for 5 minutes. The granules were then placed in a 3 pound box and placed into an oven at 176° F. (80° C.) for one hour.

TABLE 2

| Example | 4 | 5 | 6 |
|---|---|---|---|
| Oil | 0.5 g | 0.5 g | 0.5 g |
| Silicone | 0.05 g | 0.05 g | 0.05 g |
| Acrylic emulsion adhesive 1 (available under the tradename Fastbond 49 from 3M Company) | 0.5 g | 0 | 0 |
| Acrylic emulsion adhesive 2 (available under the tradename Robond PS-35 from Rohm and Haas) | 0 | 0.92 g | 0 |
| Acrylic emulsion adhesive 3 (available under the tradename Robond PS-9340 from Rohm and Haas) | 0 | 0 | 0.92 g |

Comparative Example C

One kg of white roofing granules (available as WA93 from 3M Company) was mixed with 15 grams of water. The granules were then shaken for 45 seconds. A mixture was prepared comprising 3.38 grams of petroleum hydrocarbon naphthenic oil (available as Cross L500 from Cross Oil Refining and Marketing of Arkansas) and 0.05 grams of silicone (Silicone Water Repellant BS68 available from Wacker Chemical Corp. of Michigan). The oil/silicone blend was added to the granules and the granules were then shaken for 5 minutes. The granules were then placed in a 3 pound box and placed into an oven at 176° F. (80° C.) for one hour.

Examples 7-9

Examples 7-9 were made mixing 1 kg of white roofing granules (available as WA51 from 3M Company) with 15 grams of water and an acrylic emulsion adhesive of the type and amount shown in Table 3. The granules were then shaken for 45 seconds. A mixture was prepared comprising petroleum hydrocarbon naphthenic oil (available as Cross L500 from Cross Oil Refining and Marketing of Arkansas) and silicone (Silicone Water Repellant BS68 available from Wacker Chemical Corp. of Michigan) of the amounts shown in Table 3. The oil/silicone blend was added to the granules and the granules were then shaken for 5 minutes. The granules were then placed in a 3 pound box and placed into an oven at 176° F. (80° C.) for one hour.

TABLE 3

| Example | 7 | 8 | 9 |
|---|---|---|---|
| Oil | 0.5 g | 0.5 g | 0.5 g |
| Silicone | 0.05 g | 0.05 g | 0.05 g |
| Acrylic emulsion adhesive 1 (available under the tradename Fastbond 49 from 3M Company) | 0.5 g | 0 | 0 |
| Acrylic emulsion adhesive 2 (available under the tradename Robond PS-35 from Rohm and Haas) | 0 | 0.92 g | 0 |
| Acrylic emulsion adhesive 3 (available under the tradename Robond PS-9340 from Rohm and Haas) | 0 | 0 | 0.92 g |

Comparative Example D

One kg of black roofing granules (available as WA51 from 3M Company) was mixed with 15 grams of water. The granules were then shaken for 45 seconds. The granules were then placed in a 3 pound box and placed into an oven at 176° F. (80° C.) for one hour.

Comparative Example E

One kg of medium black roofing granules (available as WA53 from 3M Company) was mixed with 15 grams of water. The granules were then shaken for 45 seconds. The granules were then placed in a 3 pound box and placed into an oven at 176° F. (80° C.) for one hour.

Comparative Example F

One kg of white roofing granules (available as WA93 from 3M company) was mixed with 15 grams of water. The granules were then shaken for 45 seconds. The granules were then placed in a 3 pound box and placed into an oven at 176° F. (80° C.) for one hour.

Comparative Example G 0.5 kg of crushed quartz having a mean particle size diameter of approximately 1 mm (available from ARW Exploration Ltd.) was heated to 360° F. and then mixed with 2.5 grams of a 5% mixture of water and a dust suppressant available under the tradename 3M™ Dust Suppressant SDS-2 from 3M Company. The sample was shaken for 5 minutes. The sample was then placed in a 3 pound box and placed in an oven at 176° F. (80° C.) for one hour.

Comparative Example H 0.5 kg of crushed quartz having a mean particle size diameter of approximately 1 mm (available from ARW Exploration Ltd.) was heated to 360° F. and then mixed with 2.5 grams of a 5% mixture of water and a dust suppressant available under the tradename 3M™ Dust Suppressant SDS-4 from 3M Company that has a Tg=8° C. The sample was shaken for 5 minutes. The sample was then placed in a 3 pound box and placed in an oven at 176° F. (80° C.) for one hour.

Comparative Example I 0.5 kg of crushed quartz having a mean particle size diameter of approximately 1 mm (available from ARW Exploration Ltd.) was heated to 360° F. and then mixed with 2.5 grams of a 5% mixture of water and a dust suppressant available under the tradename 3M™ Dust Suppressant LSP1000 from 3M Company that has a Tg=21° C. The sample was shaken for 5 minutes. The sample was then placed in a 3 pound box and placed in an oven at 176° F. (80° C.) for one hour.

Dust Generation Measurement

The Examples 1-9 and Comparative Examples A-I were measured for dust generation. Granular materials, when processed into roofing granules or other end products, may, and generally do have small particles associated with them (or generated from them) that are not chemically or physically bonded to the granules. The small particles, which may originate from either the coating or the base granules, easily become airborne during material handling procedures. "Airborne dust", for the purposes of this application, is defined as any particle between 0.3 micrometers and 30 micrometers in diameter. This test quantified the dusting for samples of granular materials.

The testing equipment used to measure airborne dust contained in a sample of granular material consisted of a dust detection instrument known under the trade designation "Met One 237 AB Particle Detector," available from Hach Company, 481 California Street, Grants Pass, Oreg. 97526. The machine was designed specifically to measure concentration of airborne dust particles using laser refraction. The instrument is calibrated to detect airborne particles of 0.3 micrometers and larger from an airflow rate of 0.0028 cubic meters per minute (0.1 cubic feet per minute). The granule sample is placed in a funnel and allowed to drop by gravity into a dust chamber to generate airborne dust. Air from this chamber is then sampled by laminar flow into the isokinetic probe and through a laser beam in the sensor. The particles in air sample scatter the laser light. This scattering is detected and converted into a count of dust particles per volume of air. In running a test, 50 grams of roofing granules to be tested were weighed and put into the funnel plugged with a stopper and mounted above the dust chamber. The stopper was then removed from the funnel to allow the granule sample to fall into the dust chamber and generate dust. At the same time the stopper is removed "Run" is pressed on the Met One instrument in order to start the dust measurement sequence. This allows the dust generated in the chamber from the falling granule sample to be sampled through the isokinetic probe and past the laser beam in the sensor to get a measure of the amount of dust generated from the granule sample. The results are reported in terms of airborne particles of 0.3 micrometers and larger per cubic centimeter of air.

In general, for non-white samples prepared or treated in the laboratory, dust levels are preferably below 500 particles/cc. For each example 3 readings were made. The average of the 3 readings are shown below in Table 4.

TABLE 4

| Example | particles/cc | Std. Dev |
| --- | --- | --- |
| Comp. Ex. A | 225 | 72 |
| 1 | 422 | 73 |
| 2 | 428 | 27 |
| 3 | 292 | 27 |
| Comp. Ex. B | 150 | 57 |
| 4 | 187 | 99 |
| 5 | 179 | 42 |
| 6 | 304 | 173 |
| Comp. Ex. C | 268 | 109 |
| 7 | 202 | 72 |
| 8 | 228 | 69 |
| 9 | 313 | 84 |
| Comp. Ex. D | 1556 | 16 |
| Comp. Ex. E | 1361 | 15 |
| Comp. Ex. F | 1311 | 15 |
| Comp. Ex. G | 1859 | 53 |
| Comp. Ex. H | 1590 | 76 |
| Comp. Ex. I | 1658 | 31 |

4-Day Stain Test

The stain test is another quality control test frequently used in the roofing granule industry. The 4-day stain test was an accelerated measurement of the tendency of roofing granules to adsorb asphaltic oils in an asphalt-based substrate. The granules of each sample were embedded in asphalt that had been heated to 365° F. (63° C.). The embedded granules were placed on a tray in an oven at 176° F. (80° C.) for 96 hours (4 days). The trays were removed from the oven, and the asphalt was allowed to cool to room temperature. The granules were then measured for staining under a LabScan colorimeter, and a staining value was calculated. Stain is measured by the total change in color measured in CIELAB (L*a*b*) units, delta E, of the unexposed and the 4-day heat exposed granules. Stain Value=$\Delta E^* = [(L^*_{4\text{-}day} - L^*_{0\text{-}day})^2 + (a^*_{4\text{-}day} - a^*_{0\text{-}day})^2 + (b^*_{4\text{-}day} - b^*_{0\text{-}day})^2]^{1/2}$. A higher stain value represents a greater change in color which is undesired. The results are shown below in Table 5.

TABLE 5

| Example | Stain Value |
| --- | --- |
| Comp. Ex. A | 0.56 |
| 1 | 0.22 |
| 2 | 0.63 |
| 3 | 1.90 |
| Comp. Ex. B | 0.98 |
| 4 | 0.11 |
| 5 | 0.32 |
| 6 | 0.26 |
| Comp. Ex. C | 2.86 |
| 7 | 0.77 |
| 8 | 0.96 |
| 9 | 2.16 |

TABLE 6

Preparation of Polyacrylate Emulsions:
The following raw materials were used in
Examples 10-14 and Comparative Examples J-L

| Chemical Name | Abbreviation | Vendor |
| --- | --- | --- |
| Methyl methacrylate | MMA | Sinopharm Chemical Reagent |
| Butyl acrylate | BA | Huayi |
| Methacrylic acid | MAA | BASF |
| 2-Hydroxyethyl acrylate | 2-HEA | BASF |
| Reasoap SR-10 | SR-10 | Adeka |
| D.I water | — | 3M |
| $Na_2S_2O_5$ | SBS | Sinopharm Chemical Reagent |
| $K_2S_2O_8$ | KPS | Sinopharm Chemical Reagent |

Example 10

Emulsion acrylate polymers were prepared with a range of Tg's for this evaluation. A typical preparation process included adding the following to a 1-liter split resin flask: D.I water (349 g); butyl acrylate (254.8 g), methyl methacrylate (14 g); methacrylic acid (5.6 g); 2-ethylhexyl acrylate (5.6 g); and a 10% solution of sodium dodecylbenzenesulfonate (5.6 g). The flask was purged with nitrogen and heated to 40° C. under stirring set at 350 rpm. Potassium persulphate (0.76 g) and sodium metasulfate (0.19 g) were then added to the flask separately.

The flask started exotherm in 9 min and the temperature reached 74° C. in 12 minutes. The temperature was kept at 74° C. for 30 minutes before cooling the flask with a breaker of cold water to 30° C. The resulted emulsion polymer was filtered with 120# mesh cheesecloth to remove coagulated materials. A small sample of this emulsion polymer was then dried and tested for its Tg using Difference Scanning calorimetry (Tg: −40.8° C.).

Examples 11-14 and Comparative Examples J-L were made using the same method as be described in Example 10. Table 7 summarizes the acrylate emulsion polymer prepared for each Example.

TABLE 7

Acrylate Polymer Examples

| Example | BA/MMA/MAA/2-HEA | Tg, ° C. |
|---|---|---|
| 10 | 91/5/2/2 | −40.8 |
| 11 | 96/0/2/2 | −44.8 |
| 12 | 85/11/2/2 | −38.1 |
| 13 | 79/17/2/2 | −35.1 |
| 14 | 72/24/2/2 | −32.3 |
| Comp. Ex. J | 66/30/2/2 | −7.2 |
| Comp. Ex. K | 60/36/2/2 | 5.3 |
| Comp. Ex. L | 53/43/2/2 | 12.4 |

All the above emulsion polymers were diluted and, sometimes, further formulated to evaluate their performances as dust suppressants.

Static Dust Control Test Method:

Dust Suppressant Application on Coal and sand Surface: The coal sample (from Powder River Basin, Wyo.) or silica sand (from Home Depot) was placed on trays with 20 mm depth, the surface area of each tray is approximately 200 cm$^2$. The application rate of the dust suppressant was approximately 1.5 liters per square meter. Two dilution levels were tested (1% solution for sand and 3% for coal). After the dust suppressants were sprayed on the coal or sand samples, the trays were placed in an oven of 40° C. for one hour to cure then in room temperature (25° C.) over night before testing. Static film strength and wind blow to surface to measure the sample weight loss. The wind blow testing was done with air gun with wind speed of 10 miles/hour on the surface and positioned with distance of 4 inches from the coal or sand surface.

In this test, the spraying amount was fixed at 0.12 L/M$^2$ (spray polymer emulsion solid: 0.5%), and the film break point was measured. Breaking point is defined as the point where the polymer films get broken and weight loss starts under the wind blow testing. The longer the break point time, the better the protection of this polymer is.

TABLE 8

| | breaking point time | | |
|---|---|---|---|
| Example | Low blowing speed | High blowing speed | Tg(° C.) |
| 10 | >10 min | 55 S | −44.8 |
| 11 | >10 min | 36 S | −40.8 |
| 12 | >10 min | 21 S | −38.1 |
| 13 | >10 min | 28 S | −35.1 |
| 14 | >10 min | <3 S | −32.3 |
| Comp. Ex. I | <3 s | Too short to record- | 21 |
| Comp. Ex. J | 5 m 53 s | To short to record | −7.2 |
| Comp. Ex. K | 3 m 27 s | To short to record- | 5.3 |
| Comp. Ex. L | 17 s | Too short to record- | 12.4 |

The above test results demonstrated a correlation between the Tg of the polymer and its dust suppression performances. Lower Tg polymers shows increased dust suppressant performance.

Dynamic Dust Control Test Method:

50 grams of the diluted sample (1% and 2% of RD-914 and others with high or low Tg) was added to 500 grams soil (or sand) in 500 ml jar, which was mixed well by tumbled in a roll machine for 30 min. After three days of evaporation in 60° C. oven and cooling to room temperature, the steel balls (a total of 100 grams in weight) were added to the jar, which was then tumbled at 60 rpm for 30 minutes. The tumbled soil was poured to a tray followed by air blow (10 mph) test. The higher the soil weight loss by air blow, the poorer the performance (more dust).

The testing results shown in Table 9 indicated that the soil weight loss over time during the wind blow after tumbling at 60 rpm for 30 minutes. Dust suppression is shown my minimizing the soil lost. Example 15 was made by coating the Acrylic emulsion adhesive available under the tradename Fastbond 49 from 3M Company, having a Tg −50° C.

TABLE 9

Dynamic testing results

| Example | % product | Tg (° C.) | weight loss 30 S | weight loss 60 S | weight loss 90 S |
|---|---|---|---|---|---|
| 15 | 0.50% | −45 | 42.7 | 88.81 | 116.75 |
| 11 | 0.50% | −44.5 | 60.07 | 154.47 | 213.68 |
| 14 | 0.50% | −35.1 | 181.23 | 275.29 | 349.78 |
| Comp. Ex. J | 0.50% | −7.2 | 184.78 | 279.51 | 354.6 |
| 15 | 1.00% | −45 | 2.17 | 4.85 | 6.98 |
| 11 | 1.00% | −44.5 | 0.5 | 1.24 | 2.06 |
| 14 | 1.00% | −35.1 | 22.25 | 45.16 | 72.49 |
| Comp. Ex. J | 1.00% | −7.2 | 56.1 | 105.13 | 146.44 |
| 15 | 2.00% | −45 | 0.41 | 0.5 | 0.95 |
| 11 | 2.00% | −44.5 | 0.26 | 0.43 | 0.54 |
| 14 | 2.00% | −35.1 | 3.74 | 8.13 | 12.6 |
| Comp. Ex. J | 2.00% | −7.2 | 39.19 | 58.22 | 79.53 |

Various modifications and alterations will become apparent to those skilled in the art without departing from the spirit and scope of the present application.

The invention claimed is:

1. An article comprising:
   a surface having dust particles thereon; and
   a coating on the surface comprising a coating polymer having a Tg less than −20° C.

2. The article of claim 1, wherein the polymer has a Tg less than −30° C.

3. The article of claim 1, wherein the polymer has a Tg less than −45° C.

4. The article of claim 1, wherein the coating polymer is selected from the group consisting of: polyacrylate and polyurethane.

5. The article of claim 1, wherein the coating polymer comprises an acrylic emulsion polymer.

6. The article of claim 5, comprising about 0.25 to about 2.0 pounds of acrylic emulsion polymer per ton of roofing granules.

7. The article of claim 1, wherein the coating comprises oil.

8. The article of claim 1, comprising about 0 to about 2.0 pounds of oil per ton of roofing granules.

9. The article of claim 1, wherein the coating comprises a biocide.

10. The article of claim 1, wherein the coating comprises a surfactant.

11. The article of claim 1, wherein the coating comprises an adhesion promoter.

12. A method of reducing dust, the method comprising:
    providing a surface having dust particles thereon; and
    coating the surface with a coating polymer with a Tg less than −20° C.

13. The method of claim 12, wherein the coating polymer has a Tg less than −30° C.

14. The method of claim 12, wherein the coating polymer has a Tg less than −45° C.

15. The method of claim 12, wherein the coating polymer is selected from the group consisting of: polyacrylate and polyurethane.

16. The method of claim 12, wherein the coating polymer comprises an acrylic emulsion polymer.

17. The method of claim 12, wherein the coating polymer is about 0.1% to about 5.0% solids.

18. The method of claim 12, wherein, after the coating, the surface is subjected to dynamic conditions.

19. The method of claim 12, wherein the coating polymer is dispersed in water.

20. The method of claim 19 wherein the coating polymer is a water-dispersed acrylate.

21. The article of claim 1, wherein the polymer is an emulsion polymer.

22. The article of claim 1, wherein the coating does not include an oil.

23. The article of claim 1, wherein the coating polymer is selected from the group consisting of: synthetic rubber, natural rubber, silicone, or an organic polymer.

24. The method of claim 12, wherein the polymer is an emulsion polymer.

25. The method of claim 12, wherein the coating does not include an oil.

* * * * *

UNITED STATES PATENT AND TRADEMARK OFFICE
CERTIFICATE OF CORRECTION

PATENT NO. : 8,507,092 B2
APPLICATION NO. : 13/366653
DATED : August 13, 2013
INVENTOR(S) : Wayne Fan et al.

It is certified that error appears in the above-identified patent and that said Letters Patent is hereby corrected as shown below:

In the Specification

Column 4
Line 44, delete "Brasillensis" and insert -- Brasiliensis --, therefor.

Column 5
Lines 43-56, delete "The structural............. herein." and insert the same on Col. 5, Line 44, as a new paragraph.

Column 6
Line 24, after "naphthenic" delete "napthcnic".

Column 10
Line 15, delete "($a^*_{4\text{-day}}$" and insert -- ($a^*_{4\text{-day}}$ --, therefor.

Column 11
Lines 2-3, delete "calorimetry" and insert -- Calorimetry --, therefor.

Signed and Sealed this
Thirty-first Day of December, 2013

Margaret A. Focarino
*Commissioner for Patents of the United States Patent and Trademark Office*